(12) United States Patent
Aust

(10) Patent No.: US 11,046,240 B2
(45) Date of Patent: Jun. 29, 2021

(54) DIRECTION INDICATOR UNIT HAVING WIPE EFFECT AND FLASHING HAZARD LIGHT FUNCTION

(71) Applicant: FORD GLOBAL TECHNOLOGIES, LLC, Dearborn, MI (US)

(72) Inventor: Frank Aust, Neuss (DE)

(73) Assignee: Ford Global Technologies, LLC, Dearborn, MI (US)

( * ) Notice: Subject to any disclaimer, the term of this patent is extended or adjusted under 35 U.S.C. 154(b) by 27 days.

(21) Appl. No.: 16/244,546

(22) Filed: Jan. 10, 2019

(65) Prior Publication Data

US 2019/0210515 A1 Jul. 11, 2019

(30) Foreign Application Priority Data

Jan. 11, 2018 (DE) ..................... 10 2018 200 334.3

(51) Int. Cl.
*B60Q 1/34* (2006.01)
*H05B 45/00* (2020.01)
(Continued)

(52) U.S. Cl.
CPC .............. *B60Q 1/343* (2013.01); *B60Q 1/38* (2013.01); *B60Q 1/46* (2013.01); *H05B 45/00* (2020.01);
(Continued)

(58) Field of Classification Search
CPC . B60Q 1/343; B60Q 1/38; B60Q 1/46; B60Q 1/34; B60Q 1/52; H05B 45/00; H05B 45/10; H05B 47/155; H05B 47/185
(Continued)

(56) References Cited

U.S. PATENT DOCUMENTS 4,556,862 A 12/1985 Meinershagen
5,353,007 A * 10/1994 Gullotti ................... B60Q 1/38
340/468

(Continued)

FOREIGN PATENT DOCUMENTS

EP 3190005 A1 7/2017
KR 20010070812 A 7/2001
(Continued)

OTHER PUBLICATIONS

DE Examination Report DE 10 2018 200 334.3 dated Dec. 4, 2018. 7 pages.
(Continued)

*Primary Examiner* — Daryl C Pope
(74) *Attorney, Agent, or Firm* — Brooks Kushman P.C.; Frank Lollo

(57) ABSTRACT

A direction indicator unit with wipe effect and flashing hazard light function has a right-side flashing light, a left-side flashing light, and a circuit arrangement. The circuit arrangement is configured to detect a first operating signal (B1) indicative of an operation of the right-side flashing light and a second operating signal (B2) indicative of an operation of the left-side flashing light, and to provide a first logical high control signal (SS1) for activating the right-side flashing light when an XOR linkage of the first operating signal (B1) and the second operating signal (B2) results as logical high, and to provide a second logical high control signal (SS2) for activating the left-side flashing light when an XOR linkage of the first operating signal (B1) and the second operating signal (B2) results as logical high.

15 Claims, 3 Drawing Sheets

(51) Int. Cl.
*H05B 45/10* (2020.01)
*H05B 47/155* (2020.01)
*H05B 47/185* (2020.01)
*B60Q 1/38* (2006.01)
*B60Q 1/46* (2006.01)

(52) U.S. Cl.
CPC ........... *H05B 45/10* (2020.01); *H05B 47/155* (2020.01); *H05B 47/185* (2020.01)

(58) Field of Classification Search
USPC ................................................ 340/472, 475
See application file for complete search history.

(56) References Cited

U.S. PATENT DOCUMENTS

| | | | | |
|---|---|---|---|---|
| 5,521,466 | A * | 5/1996 | Vincent | B60Q 1/305 315/77 |
| 5,767,589 | A * | 6/1998 | Lake | B60Q 1/30 307/10.8 |
| 8,310,357 | B2 | 11/2012 | Beach et al. | |
| 2002/0125771 | A1 * | 9/2002 | Kaminski | B60D 1/62 307/10.1 |
| 2007/0085571 | A1 * | 4/2007 | Regev | H03K 5/125 327/18 |
| 2011/0204716 | A1 * | 8/2011 | Abe | B60Q 1/382 307/10.8 |
| 2013/0200792 | A1 * | 8/2013 | Brooks | B60Q 1/305 315/77 |

FOREIGN PATENT DOCUMENTS

| | | |
|---|---|---|
| KR | 20050031512 A | 4/2005 |
| KR | 20140021872 A | 2/2014 |

OTHER PUBLICATIONS

Video clip entitled "Audi A6 sweeping led turn signal indicators (Dynamic turning lights)" uploaded by user "Alexander Rydbeck" published on Feb. 18, 2015, Retrieved from Internet https://www.youtube.com/watch?v=r9Fin7pyzDc.

Video clip entitled "Mustang 2015: US to EU tail lights sequential" uploaded by user "barvinyafilm" published on Nov. 15, 2015, Retrieved from Internet https://www.youtube.com/watch?v=7SyWdmnsMfQ.

Video clip entitled "Mustang Diode Dynamics Sequencer Tail Light Kit 2010-2019 Installation" uploaded by user "CJ Pony Parts" published on Oct. 13, 2015, Retrieved from Internet https://www.youtube.com/watch?v=8YP0b8yESbl.

* cited by examiner

US 11,046,240 B2

DIRECTION INDICATOR UNIT HAVING WIPE EFFECT AND FLASHING HAZARD LIGHT FUNCTION

CROSS-REFERENCE TO RELATED APPLICATIONS

This application claims foreign priority benefits under 35 U.S.C. § 119(a)-(d) to DE Application 10 2018 200 334.3 filed Jan. 11, 2018, which is hereby incorporated by reference in its entirety.

TECHNICAL FIELD

Various embodiments relate to a direction indicator unit, for example, having a wipe effect and flashing hazard light functions, and a motor vehicle having such a direction indicator unit.

BACKGROUND

Direction indicator units are lighting devices on motor vehicles that are used to inform other road users about a change of the travel direction of the vehicle or for notification. In general, they are implemented as flashing lights. Direction indicator units are colloquially also referred to as turn signals.

For single-track and multi-track motor vehicles, a flashing light is prescribed on the front and rear on each side, for trailers only on the rear. However, many modern multi-track motor vehicles have more than these four direction indicator units, for example, raised flashing hazard lights on the rear or in the exterior mirrors.

In addition to the normal display of the travel direction change, direction indicator units are also used as a warning device and are referred to as flashing hazard lights. In this case, all flashing lights flash simultaneously, independently of the failure of one or more flashing lights and independently of whether or not the ignition is turned on in the vehicle.

Motor vehicles may be provided with an emergency braking indicator by way of a flashing hazard light function. For this purpose, in case of emergency braking, the following traffic is warned by automatically turning on the flashing hazard light system.

In the event of emergency braking or an accident, the flashing hazard light system is turned on automatically by a control unit in the vehicle. In addition and in further examples, one of the raised flashing hazard lights, e.g. a third brake light, may flash with increased frequency relative to the other lights.

Furthermore, motor vehicles may be provided with flashing lights that include one or more activatable light emitting diodes (LEDs). If the individual LEDs are activated in a controlled manner during the flashing, an optical wipe effect arises, a type of luminous band in relation to the X axis or transverse axis of the vehicle direction from the inside to the outside. Given the case that the turn signal wipe function is to be turned off respectively on the right and left of the vehicle X axis in the case of the activation of both flashing lights of the front and/or rear side, a communication of the flashing lights with one another has to take place. This is implemented by a complex activation using a bus system on the vehicle, for example, a controller area network (CAN) bus.

SUMMARY

Various embodiments according to the present disclosure provide for an improved and less complex method of controlling the direction indicator unit. A direction indicator unit with optical wipe effect and flashing hazard light function, has a right-side flashing light and a left-side flashing light and also has a circuit arrangement. The circuit arrangement is configured to detect a first operating signal indicative of operation of the right-side flashing light and a second operating signal indicative of operation of the left-side flashing light and to provide a first logical high control signal for activating the right-side flashing light if an exclusive or (XOR) linkage of the first operating signal and the second operating signal results in logical high, and to provide a second logical high control signal for activating the left-side flashing light if an XOR linkage of the first operating signal and the second operating signal results in logical high. In other words, the first and the second operating signals are linked to one another such that a logical high control signal is only provided upon the presence of one operating signal having logical high in each case. Otherwise—i.e., in the case of both operating signals with either logical high or logical low—a logical low control signal is provided. It can thus be ensured in a surprisingly simple manner without the use of a CAN bus that if the flashing hazard light is activated, an activation signal, which is to cause a wipe effect, is not applied at the same time to one of the respective flashing lights.

According to one embodiment, the circuit arrangement has a first XOR gate for providing the first control signal and a second XOR gate for providing the second control signal. A particularly simple signal analysis can thus be provided in a very simple manner, wherein a right-side flashing light and a left-side flashing light are each associated with one XOR gate and this gate can be arranged in a manner which saves required installation space in the respective vicinity of the respective flashing light. An XOR gate is a digital logic gate with a binary output. In one example, a logical high of the XOR gate has a value of one, and a logical low of the XOR gate has a value of zero.

According to a further embodiment, the first operating signal is a first input of the first XOR gate, and the second operating signal is a first input of the second XOR gate. The circuit arrangement has a connecting element electrically conductively connecting a second input of the first XOR gate to the first input of the second XOR gate and at the same time electrically conductively connecting a second input of the second XOR gate to the first input of the first XOR gate. The respective other operating signal can thus be provided at the respective XOR gate in a particularly simple manner via the connecting element.

According to a further embodiment, the first control signal activates a first optical wipe signal generator, which is associated with the right-side flashing light, and the second control signal activates a second optical wipe signal generator, which is associated with the left-side flashing light. A particularly simple circuit arrangement can thus be provided.

According to a further embodiment, the first control signal is provided by a first turn signal switch and the second control signal is provided by a second turn signal switch. For example, the first turn signal switch can provide a control signal for the right-side flashing light and the second turn signal switch can provide a control signal for the left-side flashing light, wherein a flashing hazard light can be triggered by closing both turn signal switches simultaneously, i.e., by providing both control signals. A particularly simple circuit arrangement can thus be provided.

According to a further embodiment, the first optical wipe signal generator and the first XOR gate form a first controller and switch assembly, and the second optical wipe signal generator and the second XOR gate form a second controller and switch assembly of the circuit arrangement. The respective optical wipe signal generator and the respective XOR gate may thus be arranged in a manner which saves required installation space in the respective vicinity of the respective flashing light and in the vehicle.

Furthermore, various embodiments include a motor vehicle having such a direction indicator unit and a circuit arrangement for such a direction indicator unit.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1A:
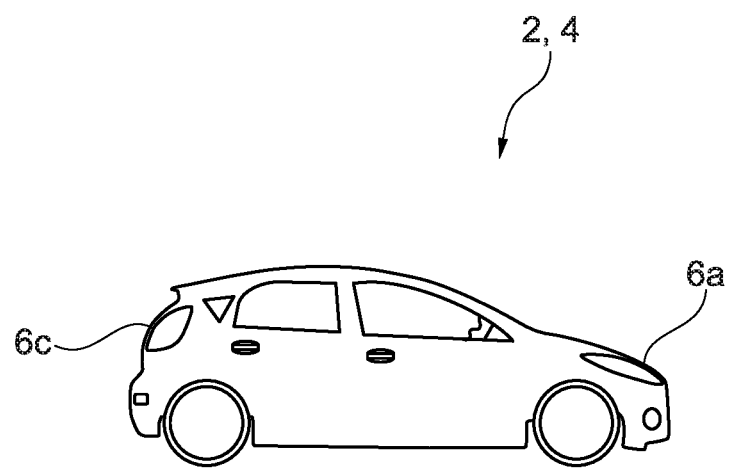
FIGS. 1A and 1B are schematic right-side and left-side illustrations, respectively, of a motor vehicle according to an embodiment.
Figure 1B:
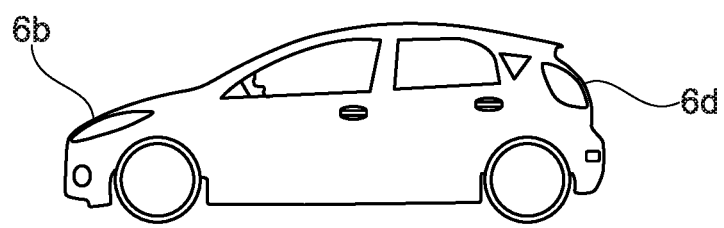

Reference will firstly be made to FIGS. 1A and 1B.

In FIGS. 1A and 1B, a motor vehicle 2 is shown, in the present embodiment as a passenger automobile.

The motor vehicle 2 has a direction indicator unit 4 having a right, front flashing light 6a, a left, front flashing light 6b, a right, rear flashing light 6c, and a left, rear flashing light 6d. Notwithstanding the present exemplary embodiment, the direction indicator unit 4 can have still further flashing lights in other embodiments and as contemplated in the disclosure.

The direction indicator unit 4 is designed for the purpose, for indicating a desired travel direction or turn direction of the vehicle, of causing either the right, front flashing light 6a and the right, rear flashing light 6c to periodically light up simultaneously or the left, front flashing light 6b and the left, rear flashing light 6d to periodically light up simultaneously, for example, each in phase at a frequency of 1.5 Hz±0.5 Hz (90 light appearances per minute±30).

The right, front flashing light 6a, the left, front flashing light 6b, the right, rear flashing light 6c, and the left, rear flashing light 6d are each formed in the present exemplary embodiment from one or more activatable LEDs. In this case, the direction indicator unit 4 is designed as a "wiping turn signal", i.e., during the flashing, the individual LEDs are activated such that an optical wipe effect arises by way of a type of luminous band from the inside to the outside by sequentially activating and deactivating the LEDs in the light along a transverse vehicle axis.

Furthermore, the direction indicator unit 4 can also be used as a warning device or flashing hazard light. If the direction indicator unit 4 is used as a warning device or flashing hazard light, all flashing lights flash simultaneously, i.e., in the present exemplary embodiment, the right, front flashing light 6a, the left, front flashing light 6b, the right, rear flashing light 6c, and the left, rear flashing light 6d are controlled to flash together.

In other words, in the case of direction indicator flashing, the respective flashing lights 6a, 6b, 6c, 6d of one vehicle side flash simultaneously, while in the case of the flashing hazard light, all flashing lights 6a, 6b, 6c, 6d of the motor vehicle 2 light up and flash simultaneously.

Furthermore, the motor vehicle 2 has a flashing hazard light function in the present exemplary embodiment. To implement this function, the direction indicator unit 4 is connected to transmit data to driver assistance systems of the motor vehicle 2 and/or a control unit, wherein the driver assistance systems and/or the control unit are designed to detect emergency braking of the motor vehicle, triggered by a motor vehicle driver or an emergency braking assistant. Upon detected emergency braking, the direction indicator unit 4 is operated as a warning device or flashing hazard light. The following traffic is thus warned by automatically turning on the flashing hazard light system in response to emergency or abrupt braking of the vehicle being detected.

For this purpose, the right, rear flashing light 6c and the left, rear flashing light 6d then expediently light up. While the direction indicator unit 4 is operated in the case of travel direction flashing as an "intermittent turn signal", however, in the case of the flashing hazard light, operation as an "intermittent turn signal" is dispensed with, i.e., all LEDs of the right, rear flashing light 6c and the left, rear flashing light 6d have to be turned on simultaneously to act as a hazard light system and override the direction indicator function, or turn signaling. This can also apply to the right, front flashing light 6a and the left, front flashing light 6b.

To ensure this operation, the direction indicator unit 4 has a circuit arrangement 8, which will now be explained with additional reference to FIG. 2.

Figure 2:
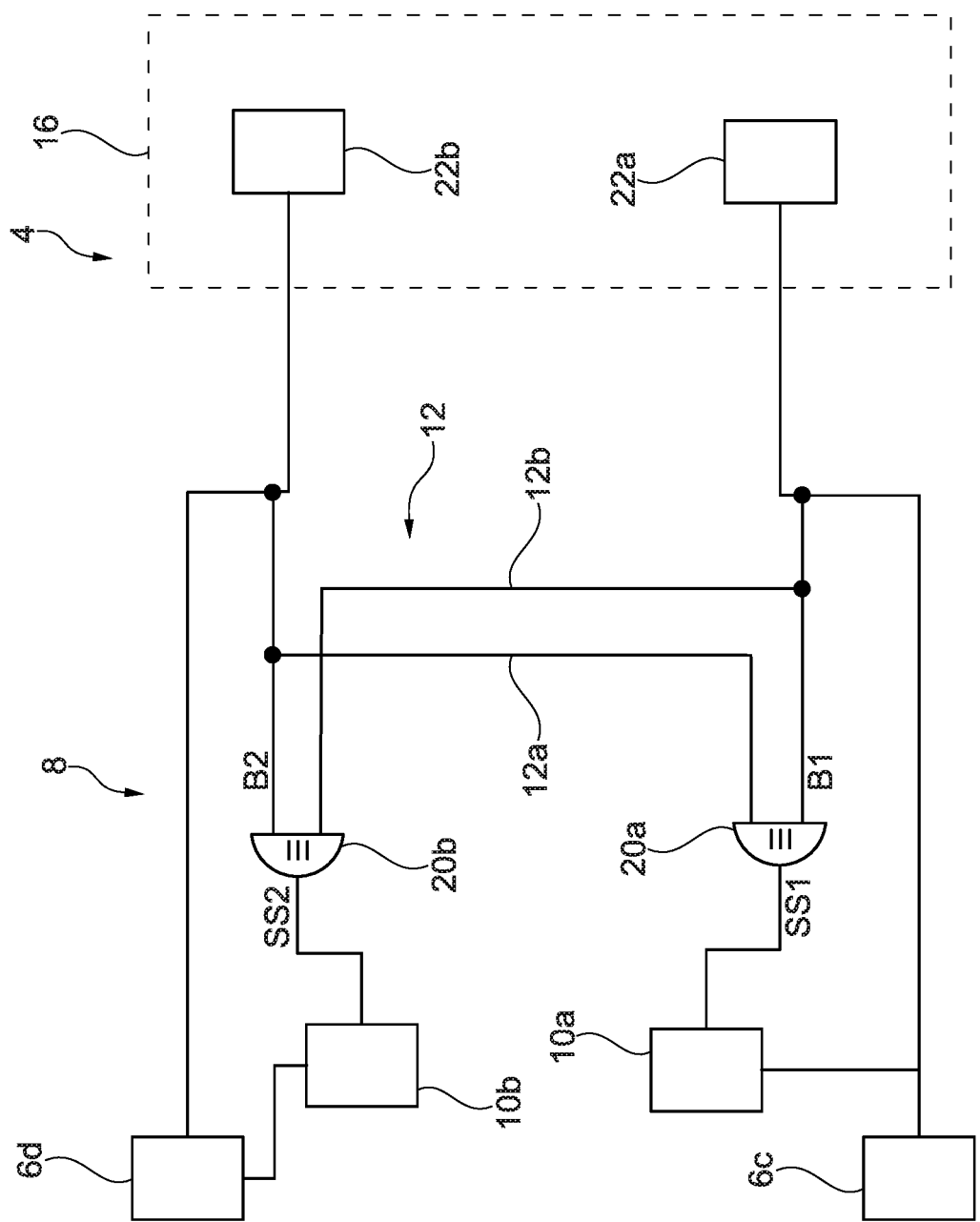
FIG. 2 is a schematic illustration of a direction indicator unit for use with the motor vehicle of FIG. 1 and having a circuit arrangement according to an embodiment.

FIG. 2 illustrates the circuit arrangement 8 of the direction indicator unit 4 with, in the present exemplary embodiment, a right wipe signal generator 10a, a left wipe signal generator 10b, a first XOR gate 20a, a second XOR gate 20b, and a direction indicator switch 16.

The direction indicator switch 16 has a right-side turn signal switch 22a and a left-side turn signal switch 22b.

The right-side turn signal switch 22a is electrically conductively connected to a first input of the first XOR gate 20a. The output of the first XOR gate 20a is electrically conductively connected to the right optical wipe signal generator 10a. The output of the right wipe signal generator 10a is electrically conductively connected to the right, rear flashing light 6c. Furthermore, the right-side turn signal switch 22a is electrically conductively connected directly to the right, rear flashing light 6c.

Similarly, the left-side turn signal switch 22b is electrically conductively connected to a first input of the second XOR gate 20b. The output of the second XOR gate 20b is electrically conductively connected to the left optical wipe signal generator 10b. The output of the left wipe signal generator 10b is electrically conductively connected to the left, rear flashing light 6d. Furthermore, the left-side turn signal switch 22b is electrically conductively connected directly to the left, rear flashing light 6d.

Furthermore, a connecting element 12 of the circuit arrangement 8 electrically conductively connects the respective second inputs of the two XOR gates 20a, 20b to one another. For this purpose, the connecting element 12 has, in the present exemplary embodiment, a first connecting line 12a and a second connecting line 12b. The first connecting line 12a electrically conductively connects the second input of the first XOR gate 20a to the first input of the second XOR gate 20b or to the left-side turn signal switch 22b. The second connecting line 12b electrically conductively connects the second input of the second XOR gate 20b to the first input of the first XOR gate 20a or to the right-side turn signal switch 22a.

In other words, the right wipe signal generator 10a is associated with the right flashing light 6c and the left wipe signal generator 10b is associated with the left flashing light 6d to generate the respective wipe effect.

The respective right optical wipe signal generator 10a and the left optical wipe signal generator 10b are activated via the direction indicator switch 16 in the context of the direction indicator flashing.

In the case of the direction indicator flashing, depending on the switch position of the direction indicator switch 16, one of the right wipe signal generator 10a or the left wipe signal generator 10b is activated, which respectively in turn causes the optical wipe effect of the respective right, rear flashing light 6c or left, rear flashing light 6d.

A respective logical high operating signal B1, B2 is thus provided by the respective turn signal switch 22a, 22b, which is supplied to the respective input of the respective XOR gate 20a, 20b via the connecting lines 12a, 12b. The signals, inputs, or outputs as described herein are digital with a value of one as logical high, or a value of zero as logical low. Since the respective other operating signal B1, B2 is logical low, the respective XOR gate 20a, 20b provides a logical high control signal SS1, SS2, which activates the associated optical wipe signal generator 10a, 10b, which in turn effectuates the optical wipe effect of the respective rear flashing light 6c, 6d.

In the case of the flashing hazard light, i.e., with closed right turn signal switch 22a and left turn signal switch 22b, for example, as a result of manual actuation by a motor vehicle driver or as a result of detected emergency braking or as a result of automatically triggered emergency braking, both operating signals B1, B2 are either logical high or logical low at the same time. Since identical input signals are then applied to the respective two inputs of the respective XOR gates 20a, 20b, both XOR gates 20a, 20b provide a respective logical low control signal S1, S2. An activation of the associated wipe signal generator 10a, 10b thus does not occur, and therefore the respective rear flashing lights 6c, 6d do not display an optical wipe effect. Therefore, in the case of the flashing hazard light, activation of the right wipe signal generator 10a and/or the left wipe signal generator 10b does not occur, independently of the switch position of the direction indicator switch 16.

It can thus be ensured in a surprisingly simple manner, without the use of the vehicle or other CAN bus, that in the case of the flashing hazard light, an activation signal providing a optical wipe effect is not simultaneously applied to the right, rear flashing light 6c and the left, rear flashing light 6d.

Figure 3:
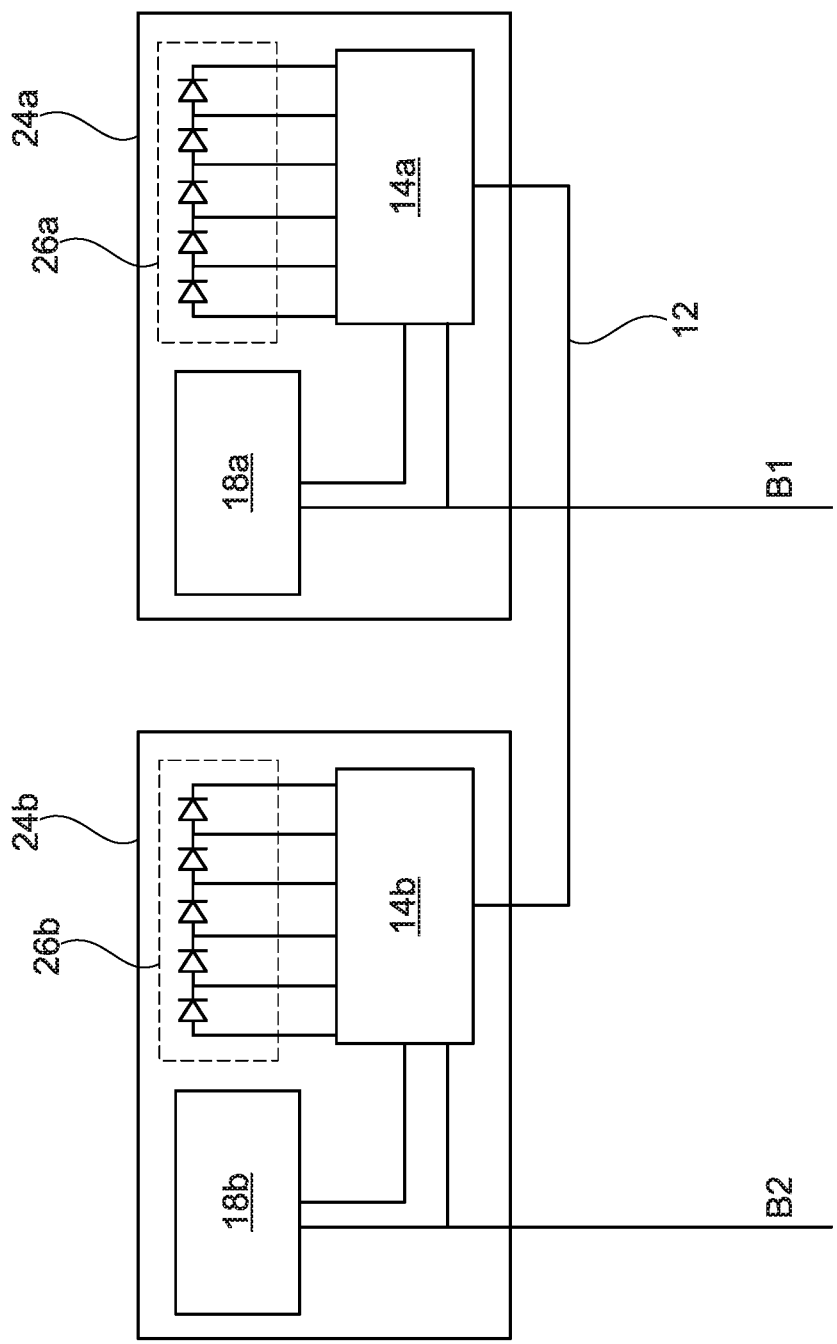
FIG. 3 illustrates another schematic with further details of the circuit arrangement as shown in FIG. 2.

With reference to FIG. 3, a right-side assembly 24a and a left-side assembly 24b are shown.

The right-side assembly 24a has a first LED current controller 18a, a first controller and switch assembly 14a, and multiple LEDs 26a. In this case, in the present exemplary embodiment, the first controller and switch assembly 14a comprises the first optical wipe signal generator 10a and the first XOR gate 20a, to provide a compact right-side assembly 24a, which occupies little installation space.

Similarly, the left-side assembly 24b has a second LED current controller 18b, a second controller and switch assembly 14b, and multiple LEDs 26b. In this case, in the present exemplary embodiment, the second controller and switch assembly 14b comprises the second optical wipe signal generator 10b and the second XOR gate 20b.

In this case, the turn signal switches 22a and 22b are service providers for the LED current controllers 18a, 18b. The control of the electrical current provided by the LED current controllers 18a, 18b is solely controlled by the first and second controller and switch assembly 14a, 14b in the present exemplary embodiment (wiping turn signal or "normal" turn signal).

A circuit arrangement 8 which occupies particularly little installation space can thus be provided.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or NVRAM, or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

While various embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the invention.

What is claimed is:

1. A circuit arrangement for a direction indicator unit of a vehicle comprising:
    a first XOR gate having a first signal input (B1) indicative of operation of a right-side flashing light;
    a second XOR gate having a first signal input (B2) indicative of operation of a left-side flashing light; and
    a connector element electrically conductively connecting a second input of the first XOR gate to the first input of the second XOR gate, the connecting element electrically conductively connecting a second input of the second XOR gate to the first input of the first XOR gate;
    wherein the first XOR gate is configured to output a first logical high control signal (SS1) for activating the right-side flashing light when an XOR linkage of B1 and B2 results as logical high;
    wherein the second XOR gate is configured to output a second logical high control signal (SS2) for activating the left-side flashing light when an XOR linkage of B1 and B2 results as logical high;
    wherein SS1 is provided by a first turn signal switch and SS2 is provided by a second turn signal switch;
    wherein SS1 activates a first optical wipe signal generator associated with the right-side flashing light;
    wherein SS2 activates a second optical wipe signal generator associated with the left-side flashing light;
    wherein the first XOR gate is configured to output a logical low control signal (S1) when an XOR linkage of B1 and B2 results as logical low such that the first optical wipe signal generator is not activated regardless of a position of the first turn signal switch; and wherein the second XOR gate is configured to output a logical low control signal (S2) when an XOR linkage of B1 and B2 results as logical low such that the second optical wipe signal generator is not activated regardless of a position of the second turn signal switch.

2. The circuit arrangement of claim 1, wherein the first wipe signal generator and the first XOR gate form a first controller and switch assembly of the circuit arrangement, and the second wipe signal generator and the second XOR gate form a second controller and switch assembly of the circuit arrangement.

3. A vehicle comprising:
a direction indicator unit having right-side and left-side flashing lights configured to indicate an optical wipe effect and a flashing hazard light function; and
a circuit arrangement configured to provide a first logical high control signal (SS1) activating the right-side light when an XOR linkage of first and second operating signals (B1, B2) indicative of operation of the right-side and left-side flashing lights, respectively, results as logical high, wherein the circuit arrangement is further configured to provide a second logical high control signal (SS2) for activating the left-side light when an XOR linkage of B1 and B2 results as logical high;
wherein the direction indicator unit has a turn signal input having a first turn signal switch and a second turn signal switch, wherein SS1 is provided by the first turn signal switch, and SS2 is provided by the second turn signal switch.

4. The vehicle of claim 3, wherein SS1 activates a first optical wipe signal generator associated with the right-side flashing light; and
wherein SS2 activates a second optical wipe signal generator associated with the left-side flashing light.

5. The vehicle of claim 4, wherein the circuit arrangement has a first XOR gate for providing SS1 and a second XOR gate for providing SS2.

6. The vehicle of claim 5, wherein B1 is a first input of the first XOR gate and B2 is a first input of the second XOR gate; and
wherein the circuit arrangement has a connecting element electrically conductively connecting a second input of the first XOR gate to the first input of the second XOR gate, the connecting element electrically conductively connecting a second input of the second XOR gate to the first input of the first XOR gate.

7. The vehicle of claim 6, wherein the first XOR gate is configured to output a logical low control signal (S1) when an XOR linkage of B1 and B2 results as logical low such that the first optical wipe signal generator is not activated regardless of a position of the first turn signal switch; and
wherein the second XOR gate is configured to output a logical low control signal (S2) when an XOR linkage of B1 and B2 results as logical low such that the second optical wipe signal generator is not activated regardless of a position of the second turn signal switch.

8. The vehicle of claim 3 wherein SS1 activates a first optical wipe signal generator associated with the right-side flashing light.

9. The vehicle of claim 8 wherein SS2 activates a second optical wipe signal generator associated with the left-side flashing light.

10. The vehicle of claim 9 wherein the circuit arrangement has a first XOR gate for providing SS1 and a second XOR gate for providing SS2.

11. The vehicle of claim 10 wherein the first wipe signal generator and the first XOR gate form a first controller and switch assembly of the circuit arrangement, and the second wipe signal generator and the second XOR gate form a second controller and switch assembly of the circuit arrangement.

12. The vehicle of claim 3 wherein the circuit arrangement has a first XOR gate for providing SS1 and a second XOR gate for providing SS2.

13. The vehicle of claim 12 wherein B1 is a first input of the first XOR gate and B2 is a first input of the second XOR gate.

14. The vehicle of claim 13 wherein the circuit arrangement has a connecting element electrically conductively connecting a second input of the first XOR gate to the first input of the second XOR gate, the connecting element electrically conductively connecting a second input of the second XOR gate to the first input of the first XOR gate.

15. The vehicle of claim 12 wherein SS1 activates a first wipe signal generator associated with the right-side light, and SS2 activates a second wipe signal generator associated with the left-side light.

* * * * *